United States Patent
Kumar et al.

(10) Patent No.: US 6,624,833 B1
(45) Date of Patent: Sep. 23, 2003

(54) GESTURE-BASED INPUT INTERFACE SYSTEM WITH SHADOW DETECTION

(75) Inventors: Senthil Kumar, Aberdeen, NJ (US); Jakub Segen, Fair Haven, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/551,041

(22) Filed: Apr. 17, 2000

(51) Int. Cl.$^7$ .................................................. G09G 5/00
(52) U.S. Cl. ........................ 345/863; 345/156; 345/157; 345/158
(58) Field of Search ................................ 345/863, 156, 345/157, 158

(56) References Cited

U.S. PATENT DOCUMENTS

| | | | | |
|---|---|---|---|---|
| 4,468,694 A | * | 8/1984 | Edgar ........................... | 348/135 |
| 4,873,651 A | * | 10/1989 | Raviv ........................... | 250/224 |
| 5,528,263 A | * | 6/1996 | Platzker et al. ............. | 345/156 |
| 5,943,164 A | * | 8/1999 | Rao ............................. | 345/418 |
| 6,512,507 B1 | * | 1/2003 | Furihata et al. ............. | 345/157 |

OTHER PUBLICATIONS

H. Nishino et al., "Interactive Two–Handed Gesture Interface in 3D Virtual Environments," Proc. ACM Symp. Virtual Reality Software and Technology, pp. 1–8, 1997.
W.T. Freeman et al., "Television Control by Hand Gestures," Proc. International Conference on Automatic Face and Gesture Recognition, pp. 179–183, Jun. 1995.
R. Kjeldsen et al., "Toward the Use of Gesture in Traditional User Interfaces," Proc. International Conference on Automatic Face and Gesture Recognition, pp. 151–156, Oct. 1996.
M.R.J. Kohler, "System Architecture and Techniques for Gesture Recognition in Unconstraint Environments," Proc. Int. Conf. Virtual Systems and Multimedia, 10 pages, 1997.
C. Maggioni, "GestureComputer—New Ways of Operating a Computer," Proc. International Conference on Automatic Face and Gesture Recognition, pp. 166–171, Jun. 1995.
A. Utsumi et al., "Multiple–Hand–Gesture Tracking using Multiple Cameras," Proc. International Conference Computer Vision and Pattern Recognition, pp. 473–478, Jun. 1999.

(List continued on next page.)

*Primary Examiner*—John Cabeca
*Assistant Examiner*—Blaine Basom

(57) ABSTRACT

An input interface system provides gesture-based user control of an application running on a computer by classification of user gestures in image signals. A given one of the image signals is processed to determine if it contains one of a number of designated user gestures, e.g., a point gesture, a reach gesture and a click gesture, each of the gestures being translatable to a particular control signal for controlling the application. If the image signal is determined to contain a point gesture, further processing is performed to determine position and orientation information for a pointing finger of a hand of the user and its corresponding shadow. The position and orientation information for the pointing finger and its shadow are then utilized to generate a three-dimensional pose estimate for the pointing figure in the point gesture. For example, the three-dimensional pose estimate may be in the form of a set of five parameters (X, Y, Z, $\alpha$, $\epsilon$), where (X, Y, Z) denotes the position of a tip of the pointing finger in three-dimensional space, and ($\alpha$, $\epsilon$) denotes the respective azimuth and elevation angles of an axis of the pointing finger. The point gesture can thus be used to provide user control in virtual flight simulators, graphical editors, video games and other applications.

14 Claims, 3 Drawing Sheets

OTHER PUBLICATIONS

P. Wellner, "The DigitalDesk Calculator: Tactile Manipulation on a Desktop Display," Proc. ACM Symposium on User Interface Software and Technology, pp. 1–7, Nov. 1991.

T. Huang et al., "Hand Gesture Modeling, Analysis and Synthesis," Proc. International Conference on Automatic Face and Gesture Recognition, pp. 73–79, Jun. 1995.

A. Azarbayejani et al., "Visually Controlled Graphics," IEEE Transactions on Pattern Recognition and Machine Intelligence, pp. 1–4, Jun. 1993.

R. Kjeldsen et al., "Visual Hand Recognition for Window System Control," Proc. International Conference on Automatic Face and Gesture Recognition, pp. 184–188, Jun. 1995.

J.M. Rehg et al., "DigitEyes: Vision Based Human Hand Tracking," CMU Tech Report CMU–CS–93–220, 25 pages, 1993.

D. Weimer et al., "Interaction Techniques using Hand Tracking and Speech Recognition," Multimedia Interface Design, ed. M. Blettner and R. Dannenbergc, Addison–Wesley, pp. 109–126, 1992.

J. Segen et al., "GestureVR: Vision–Based 3D Hand Interface for Spatial Interaction," Proc. Sixth ACM International Multimedia Conference, Bristol, U.K., pp. 1–23, Sep. 1998.

* cited by examiner

POINT  REACH
CLICK  GROUND (a)  (b)

(a)  (b)

GESTURE-BASED INPUT INTERFACE SYSTEM WITH SHADOW DETECTION

RELATED APPLICATION

The present application is related to U.S. patent application Ser. No. 09/551,042, filed concurrently herewith in the name of inventors S. Kumar and J. Segen and entitled "Gesture-Based Input Interface System Using a Single Camera," which application is incorporated herein by reference.

FIELD OF THE INVENTION

The present invention relates generally to man-machine interfaces, and more particularly to gesture-based input interface systems for communicating information to computers or other display-based processing systems via user hand gestures.

BACKGROUND OF THE INVENTION

Speech and gestures are the most commonly used means of communication among humans. Yet, when it comes to communicating with computers, the typical home or business user is still bound to devices such as the keyboard and the mouse. While speech recognition systems are finding their way into low-cost computers, there is a real need for gesture recognition systems that provide robust, real-time operation at low cost, so as to be readily available to the typical home or business user.

Interest in vision-based gesture recognition has been growing since early 1990s. See T. Huang and V. Pavlovic, "Hand Gesture Modeling, Analysis and Synthesis," Proc. International Conference on Automatic Face and Gesture Recognition, pp. 73–79, June 1995, for a review of various conventional techniques.

Much of this effort has been devoted specifically to gesture-based computer interfaces, as described in, e.g., A. Azarbayejani, T. Starner, B. Horowitz, and A. Pentland, "Visually Controlled Graphics," IEEE Transactions on Pattern Recognition and Machine Intelligence, 15(6):602–605, June 1993, R. Kjeldsen and J. Kender, "Visual Hand Recognition for Window System Control," Proc. International Conference on Automatic Face and Gesture Recognition, pp. 184–188, June 1995, R. Kjeldsen and J. Kender, "Towards the use of Gesture in Traditional User Interfaces," Proc. International Conference on Automatic Face and Gesture Recognition, pp. 151–156, October 1996, M. W. Krueger, "Artificial Reality II," Addison-Wesley, 1991, C. Maggioni, "GestureComputer—New Ways of Operating a Computer," Proc. International Conference on Automatic Face and Gesture Recognition, pp.166–171, June 1995, J. M. Rehg and T. Kanade, "DigitalEyes: Vision Based Human Hand Tracking," CMU Tech Report CMU-CS-93-220, 1993, W. T. Freeman and C. D. Weissman, "Television Control by Hand Gestures," Proc. International Conference on Automatic Face and Gesture Recognition, pp. 179–183, June 1995, A. Utsumi and J. Ohya, "Multiple-Hand-Gesture Tracking Using Multiple Cameras," Proc. International Conference Computer Vision and Pattern Recognition, pp. 473–478, June 1999, M. Kohler, "System Architecture and Techniques for Gesture Recognition in Unconstraint Environments," Proc. Int. Conf. Virtual Systems and Multimedia, 1997, H. Nishino et al., "Interactive Two-Handed Gesture Interface in 3D Virtual Environments," Proc. ACM Symp. Virtual Reality Software and Technology, 1997, J. Segen, "Controlling Computers with Gloveless Gestures," Proceedings of Virtual Reality Systems, 1993, V. J. Vincent, "Delving in the depth of the mind," Proc. Interface to Real and Virtual Worlds, 1991, D. Weimer and S. K. Ganapathy, "Interaction Techniques using Hand Tracking and Speech Recognition," Multimedia Interface Design, ed. M. Blettner and R. Dannenberge, pp.109–126, Addison-Wesley, 1992, P. Wellner, "The DigitalDesk Calculator: Tangible Manipulation on a Desktop Display," Proc. ACM Symposium on User Interface Software and Technology, November 1991.

By way of example, the above-cited C. Maggioni reference describes a system using two cameras, that detects the position of the palm of a user's hand in three dimensions (3D). The system can recognize six static gestures, and is used as interface to a virtual environment. As another example, the above-cited R. Kjeldsen and J. Kender references describe a neural net based gesture recognition and hand tracking system that can be used in place of a mouse to move and resize computer windows.

A gesture-based input interface system is described in U.S. patent application Ser. No. 08/887,765; filed Jul. 3, 1997, now U.S. Pat. No. 6,252,298, issued Jun. 26, 2001, in the name of inventor J. Segen, which application is commonly assigned herewith and incorporated by reference herein.

A known multiple-camera gesture-based input interface system referred to as GestureVR is described in J. Segen and S. Kumar, "GestureVR: Vision-Based 3D Hand Interface for Spatial Interaction," Proc. Sixth ACM International Multimedia Conference, Bristol, U.K., September 1998, which is incorporated by reference herein. This system provides a number of advantages over the other systems noted above.

Additional details regarding the GestureVR system and other gesture-based input interface systems are disclosed in U.S. patent application Ser. No. 09/208,079 filed Dec. 9, 1998, now U.S. Pat. No. 6,204,852, issued Mar. 20, 2001, in the name of inventors S. Kumar and J. Segen and entitled "Video Hand Image Three-Dimensional Computer Interface," and U.S. patent application Ser. No. 09/208,196, filed Dec. 9, 1998, now U.S. Pat. No. 6,147,678, issued Nov. 14, 2000, in the name of inventors S. Kumar and J. Segen and entitled "Video Hand Image Three-Dimensional Computer Interface With Multiple Degrees of Freedom," both commonly assigned herewith and incorporated herein by reference.

It is also known in the art to utilize shadows in computer vision image processing applications. An example of one such application is in the area of extracting buildings from aerial images, with shadows being used to generate or verify building hypotheses and to estimate building heights. Such techniques are referred to as "shape from shading" techniques. See, e.g., D. G. Lowe and T. O. Binford, "The Interpretation of Geometric Structure from Image Boundaries," ARPA IUS Workshop, pp. 39–46, 1981, and C. Lin and R. Nevatia, "Building Detection and Description from a Single Intensity Image," Computer Vision and Image Understanding, 72(2):101–121, 1998. Shadows have also been used to infer object shapes, as described in, e.g., S. A. Shafer and T. Kanade, "Using Shadows in Finding Surface Orientations," CVGIP, 22:145–176, 1983, J R. Kender and E. M. Smith, "Shape from Darkness: Deriving Surface Information from Dynamic Shadows," Proc. ICCV, 1987, D. Raviv, Y. Pao, and K. A. Loparo, "Reconstruction of Three-Dimensional Surfaces from Two Dimensional Binary Images," IEEE Trans. Rob. and Auto, 5(10):701–710, 1989, and L. Wang and J. J. Clark, "Shape from Active Shadow Motion," Proc. SPIE Conf. on Intelligent Robots and Computer Vision: Active Vision and 3D Methods, Boston, Mass., 1993. Compared to "shape from shading" techniques, these "shape from shadow" techniques have an advantage in that they do not require surface reflectance maps.

Although shadow processing has been applied in the above-noted computer vision applications, it has not heretofore been applied to improving detection of gestures in a gesture-based input interface system.

In view of the foregoing, a need remains for a gesture-based input interface system that utilizes shadow processing and is capable of providing robust, real-time operation in a low-cost manner more readily accessible to typical home and business users.

SUMMARY OF THE INVENTION

The present invention provides an improved gesture-based input interface system which meets the above-identified need.

An input interface system in accordance with the invention provides gesture-based user control of an application running on a computer. Image signals generated by a camera are processed to determine if the image signals contains one of a number of designated user gestures, e.g., a point gesture, a reach gesture and a click gesture, each of the gestures being translatable to a particular control signal for controlling the application.

In accordance with the invention, if a given image signal is determined to contain a point gesture, the image signal is further processed to determine position and orientation information for a pointing finger of a hand of the user and its corresponding shadow. The position and orientation information for the pointing finger and its shadow are then utilized to generate a three-dimensional pose estimate for the pointing figure in the given gesture. The generation of a three-dimensional pose estimate for the point gesture can be used to allow user manipulation of objects in three-dimensions within the application running on the computer.

For example, the position and orientation for the pointing finger may comprise a pair of two-dimensional poses, one representing an extracted image signal peak corresponding to the pointing finger and the other representing an extracted image signal peak corresponding to the shadow of the pointing finger. More particularly, the pair of two-dimensional poses may be of the form $\{(x,y,\theta), (x_s,y_s,\theta_s)\}$, where $(x,y)$ and $\theta$ denote the position of the tip and orientation, respectively, of the pointing finger in two-dimensional space, and $(x_s,y_s)$ and $\theta_s$ denote the position of the tip and orientation, respectively, of the shadow of the pointing finger in two-dimensional space. The three-dimensional pose estimate generated from the pair of two-dimensional poses may be in the form of a set of five parameters $(X, Y, Z, \alpha, \epsilon)$, where $(X, Y, Z)$ denotes the position of the tip of the pointing finger in three-dimensional space, and $(\alpha, \theta)$ denotes the respective azimuth and elevation angles of an axis of the pointing finger.

Advantageously, the gesture-based input interface system of the present invention can be used as an input interface to many different types of multi-dimensional computer or other processing device-based applications, such as virtual flight simulators, graphical editors and video games. The system provides robust, real-time operation in a substantially user-independent manner. Moreover, the system can be implemented using an inexpensive off-the-shelf camera or other image capture device and requires minimal computational resources. The gesture-based system of the present invention thus offers an efficient, low-cost solution that is readily accessible to the typical home or business user.

DETAILED DESCRIPTION OF THE INVENTION

The present invention will be illustrated herein in the context of a particular computer input interface system. It should be understood, however, that the techniques described are not limited to use with this system or any other particular type of system.

1. Input Interface System

Figure 1:
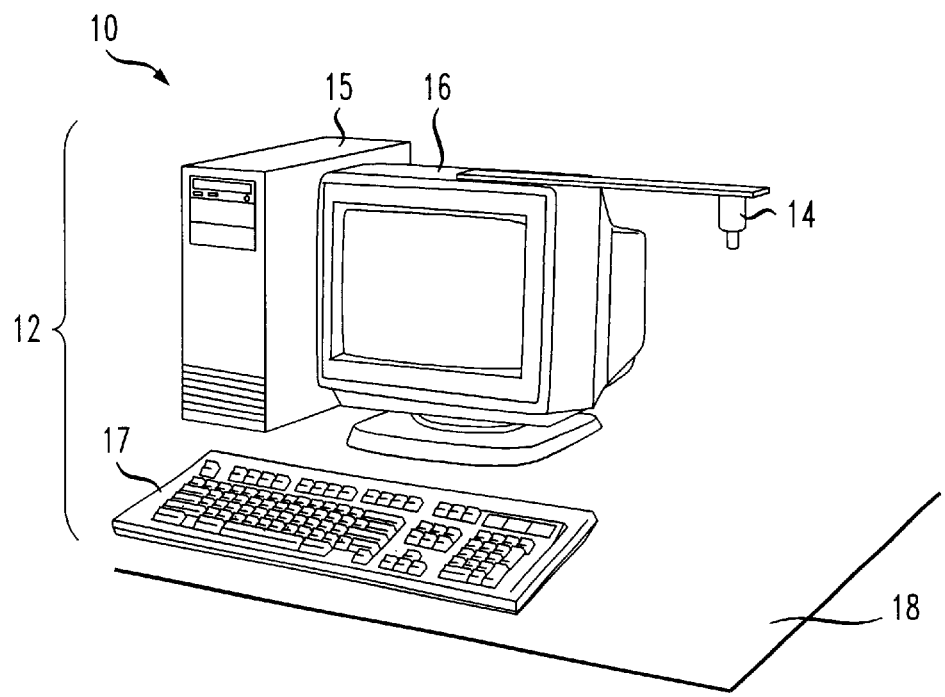
FIG. 1 shows an illustrative embodiment of an input interface system in accordance with the invention.

FIG. 1 shows an exemplary configuration of a gesture-based computer input interface system 10 in accordance with an illustrative embodiment of the invention. The system 10 includes a computer system 12 and a camera 14. The computer system 12 includes a computer 15, monitor 16 and keyboard 17. The camera 14 is attached to the monitor 16 as shown. The computer system 12 is arranged on a flat surface 18 such as a table top or desktop, and the camera 14 is positioned so as to "look" downward toward the flat surface 18.

Figure 2:
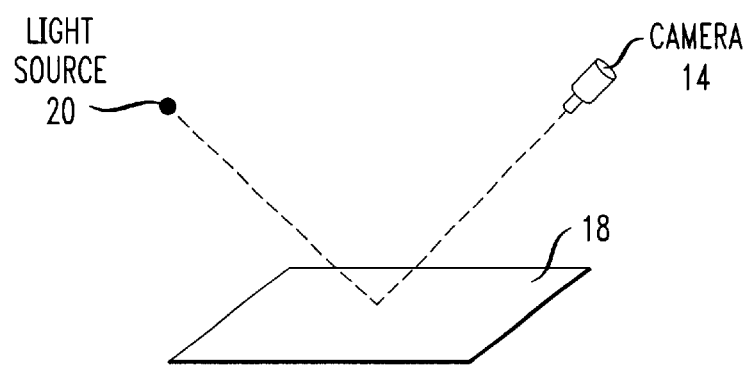
FIG. 2 illustrates the relationship between a camera and a light source in the illustrative embodiment of FIG. 1.

Although not shown in FIG. 1, the system 10 also has a light source associated therewith. FIG. 2 illustrates one example of a possible relationship between the camera 14, flat surface 18 and a light source 20. In this example, the light source 20 is arranged such that when a user's hand is placed between the camera 14 and the surface 18, the light generated by the light source is incident on the user's hand at an angle. A shadow of the user's hand is thus created on the surface 18. The camera generates a video signal which captures images of the hand and its shadow.

As will be described in greater detail below, the present invention processes images of the user hand and its shadow in order to detect designated user gestures that are translatable to control signals for the computer system 12. More particularly, the illustrative embodiment of the invention uses depth cues obtained from projections of the hand and its shadow to compute the three-dimensional position and orientation of one or more fingers. The position and orientation information is then translated into a control signal for the computer system 12.

The light source 20 may be attached to the monitor 16 or other element of the system 10 in a manner similar to that used to attach the camera 14 in FIG. 1. Alternatively, light source 20 may be a stand-alone lamp on surface 18 or adjacent thereto, an overhead lamp or lighting fixture, or any other type of source capable of producing a shadow that is detectable using the techniques of the invention.

It should be noted that the background provided by the flat surface 18 is preferably a high-contrast, stationary background which allows generation of an image in which both the hand and its shadow are detectable. In addition, the system 10 is also preferably arranged in an environment with stable ambient illumination.

In operation, a user controls one or more applications running on the computer system 12 by placing his or her hand above the flat surface 18 and below the camera 14, and gesturing within a three-dimensional (3D) field of view of the camera 14. The gestures and corresponding shadows are captured in a video signal generated by the camera 14. The system 10 then processes the video signal using control software described in greater detail below in order to detect and identify the particular hand gestures made by the user, and to translate those gestures into control signals for the applications running on the computer system 12.

The interface system lo can be configured to compute the above-noted multiple control parameters in real-time. More specifically, the system 10 in the illustrative embodiment runs at the ail National Television Systems Committee (NTSC) 60 Hz field rate of the monitor 16. Advantageously, since the system 10 uses a single video signal source, it can run readily on a standard home or business computer equipped with an inexpensive camera and is, therefore, more accessible to most users than other known systems. Furthermore, the system 10 can be used with any type of computer applications that require 2D or 3D spacial interactions. Specific examples to be described in greater detail below include virtual fly-thrus, graphical scene composers and video games.

Although FIG. 1 illustrates the operation of input interface system 10 in conjunction with a conventional desktop computer system 12, the system 10 can of course be utilized with other types of information processing devices, such as portable or palmtop computers, workstations, personal digital assistants (PDAs), televisions, set-top boxes, etc. The term "computer" as used herein is intended to include these and other processor-based devices.

Figure 3:
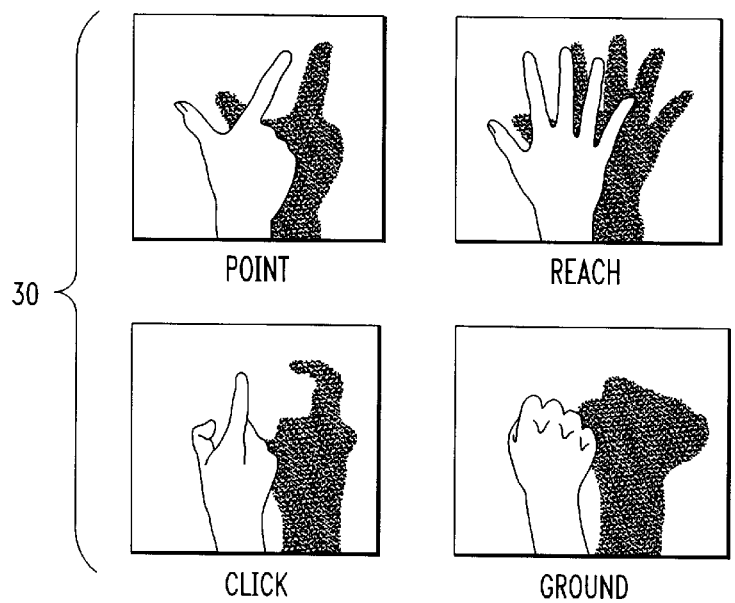
FIG. 3 shows an example of a set of gestures that are used in the illustrative input interface system of FIG. 1.

FIG. 3 shows a set of gestures 30 recognized by the input interface system 10 in the illustrative embodiment. The gestures point and reach are static gestures, while click is a dynamic gesture that involves a quick bending of the index finger. The ground gesture represents a class of gestures which includes all other gestures as well as the empty image. It should be noted that the thumb need not be extended for the point gesture.

As will be described in greater detail below, the system 10 utilizes recognition and pose estimation techniques based on boundary analysis of the hand and shadow regions of an image. These techniques are very fast and allow real-time operation of the system 10. Moreover, these techniques are robust, exhibiting very low error rates and insensitivity to skin complexions and individual hand characteristics. The recognized gestures may be mapped into application commands such as "click," "open door," "fire gun," etc., and the estimated pose parameters are used as numerical arguments to control spatial parameters such as direction of flight and speed.

The shadow-based gesture detection in the illustrative embodiment of the invention operates as follows. First, boundaries of the hand and the shadow regions are extracted from a given image generated by the camera 14, and features corresponding to curvature extrema are determined. These features are then input to a finite state classifier which classifies the image into one of the four gesture classes noted above, i.e., point, reach, click and ground. If the gesture is point, the boundaries are analyzed further to determine two planar poses, one from the image of the pointing finger and the other from the image of its shadow. A given planar pose comprises the triple,(x, y, θ) representing the position and orientation of the pointing finger measured in image coordinates. These two planar poses are then combined to determine the 3D pose of the finger in the-system coordinate frame. The process is repeated for the thumb if necessary. The next section describes the 2D analysis process in greater detail, and the section following that describes the 3D pose estimation process.

2. Two-Dimensional (2D) Analysis

This section describes the 2D analysis stage of the gesture detection process in accordance with the invention. It covers feature extraction, gesture recognition and planar pose computation.

This 2D analysis is based in part on techniques described in J. Segen and S. Kumar, "Human-Computer Interaction using Gesture Recognition and 3D Hand Tracking," Proc. ICIP, Chicago," pp. 188–192, 1998, which is incorporated by reference herein.

2.1 Feature Extraction

The first step in the 2D analysis stage is to extract connected regions in a given input image by comparing the input image with a previously acquired and stored background image. This generally requires either a stationary background or an adaptive adjustment of the background image. After extracting the regions, the boundary of each region is represented as a list of pixel positions $\{P(i)\}=\{(x(i),y(i))\}$, arranged in a clockwise order. Regions that do not correspond to the hand and the shadow are discarded, e.g., using heuristic screening based on perimeter length.

After extracting the boundaries, a k-curvature measure is computed at each boundary point. This measure is defined by an angle $C(i)$ between two vectors $P(i-k)P(i)$ and $P(i)P(i+k)$, where k is a constant. Points corresponding to local curvature extrema are identified as local features. Among these local features, some are labeled as "peaks" and some as "valleys," while others are discarded. Peaks are those features whose curvatures are positive, denoting a locally convex boundary, with magnitudes greater than a fixed threshold $Ph_{thr}$, and valleys are features whose curvatures are negative, denoting a locally concave boundary, with magnitudes less than a fixed threshold $V_{thr}$.

Figure 4:
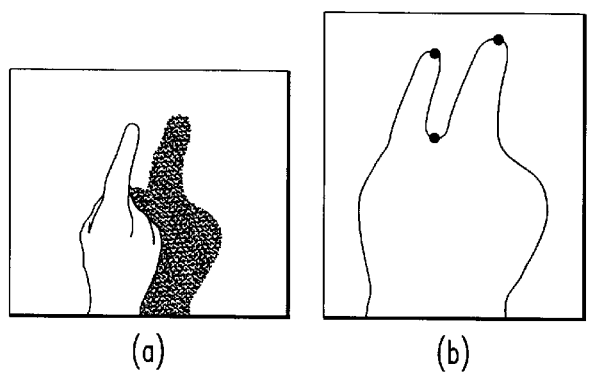
FIGS. 4(a) and 4(b) illustrate detection of a point gesture in the set of gestures of FIG. 3 using local feature detection in accordance with the invention.

FIGS. 4(a) and 4(b) illustrate the extraction of two peaks and a valley from a given image. FIG. 4(a) shows the original image. FIG. 4(b) shows the corresponding processed image, which includes an extracted boundary of the hand and shadow. The above-described computations lead to identification and extraction of two peaks and a valley from the FIG. 4(b) image. Here, the peaks are denoted by filled circles and the valley by a filled square.

After extracting the peaks and valleys, each feature is classified as belonging to the hand or the shadow. This is done by comparing the hue and saturation values in the neighborhood of the given feature to those in the corresponding neighborhood of the background image. If the values differ significantly, the feature is classified as belonging to the hand. Otherwise, it is classified as belonging to the shadow. Features belonging to the hand are then input to a finite state classifier that performs gesture classification, in the manner described below.

2.2 Gesture Classification

The number of peaks and valleys in the hand region are indicative of the gesture. For example, the point gesture can generally have at most two peaks, one for the pointing finger and the other for the thumb. Note that features on the shadow are not considered in this classification. Based on the above observation, preliminary gesture classification can be performed using the following rule:

$(N_{peaks} > T_1)$ and $(N_{peaks} < T_2) \rightarrow$ point $(N_{peaks} > T_3)$ and $(N_{valleys} > T_4) \rightarrow$ reach where $T_1$, $T_2$, $T_3$ and $T_4$ are preset thresholds. The result of this classification is stored in a variable referred to as class. If the value of the variable class is not set to point or reach in accordance with the above rule, it is set to ground.

The value of the variable class is then passed to the finite state classifier which determines the gesture. The type of gesture is stored in a variable state, which takes one of four values: ground, reach, point, and click. The new value of state depends on the previous value of state and additional analysis of the boundary.

The finite state classifier operates as follows. If class is not point then it is returned as the new state. If class is point, the pointing finger is found and the poses are computed. If the previous value of state is either point or click, the test for click is performed, setting state to click if the test succeeds or to point if the test fails. If the previous value of state is reach or ground, state is set to the same value as class.

Figure 5:
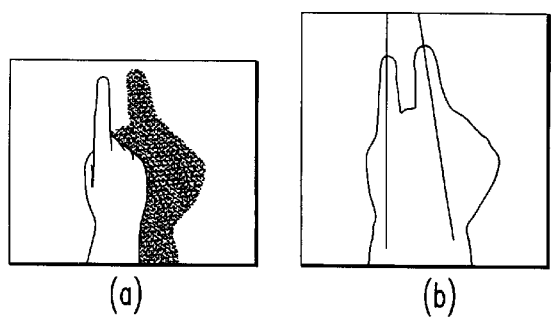
FIGS. 5(a) and 5(b) illustrate pose computation in accordance with the invention.

At termination, the variable state identifies the gesture. If the gesture is point, further boundary analysis is performed to determine if the thumb is also visible. For each visible finger, two poses are computed, one from the hand region and the other from the shadow region. An example is shown in FIGS. 5(a) and 5(b), and described in detail below.

The click gesture is defined as a "stop-and-click," rather than a "running click." In other words, during the click gesture, the dominant motion is only from the pointing finger, the rest of the hand remains more or less motionless. A gesture is classified as click if the whole hand has not significantly moved from the previous image, i.e., previous frame of the video signal, and the position component of the pose has shifted by a specified amount towards the interior of the region. The motion of the hand is measured using a set of reference points along the hand boundary selected outside the pointing finger.

2.3 Planar Pose Estimation

The planar pose estimation process is executed for a given image only if the variable class has the value point. Recall that the thumb need not be extended in the point gesture. It will be assumed for now that this is the case, and the operation of the pose finder will initially be described for this situation. As shown in FIG. 4(b), this case gives rise to two peaks, one on the hand boundary and the other on the shadow boundary. Note that the two boundaries need not be connected. For each peak, a local boundary analysis is performed in the vicinity of the peak and a planar pose is computed.

Consider first the peak corresponding to the hand region. The boundary is represented as a sequence of (x, y) coordinates ordered clockwise. Let $P(i) = [x_i, y_i]^T$ denote the $i_{th}$ point along the contour and let N be the total number of points on the contour. Also, let $P(i_f)$ denote the peak. A cyclic norm cnorm (x) is defined as:

$$cnorm(x) = \begin{cases} x + N & : \quad x < 0 \\ x - N & : \quad (x+1) > N \\ x & : \quad \text{Otherwise} \end{cases} \quad (1)$$

$P(cnorm(i_f+k))$ denotes a point that is k points away from $P(i_f)$ to its right along the hand contour, and $P(cnorm(i_f+k))$ denotes a point that is k points away from $P(i)$ to its left. Their midpoint Q(k) is given by $$Q(k) = \frac{P(cnorm)(i_f + k) + P(cnorm(i_f - k))}{2}.$$

The midpoint Q(k) is computed for $k_{min} < k < k_{max}$ where $k_{min}$ and $k_{max}$ are constants. A line L is then fit to the resulting midpoints Q(k). The line determines the pose (x,y, θ), where (x,y) is the point of intersection of the line L with the boundary and θ its orientation. Repeating the above process for the peak corresponding to the shadow results in another planar pose ($x_s$, $y_s$, $θ_s$).

FIG. 5(b) shows the resulting pose estimates generated using the above-described pose estimation process for the image shown in FIG. 5(a). The process in this example results in two planar poses for the pointing finger, one from the hand region and the other from the shadow region, as shown in FIG. 5(b). As explained in the next section, these two poses are further processed to obtain the 3D position and orientation of the finger.

The case of a point gesture with an extended thumb will now be described. If the thumb is extended in addition to the pointing finger, there will be a total of four peaks corresponding to the two fingertips and their shadows. Let P and Q be the two peaks that lie in the hand region. Assume that the hand is a right hand, it is easy to determine which peak corresponds to the pointing finger and which corresponds to the thumb. For example, if P is the $p_{th}$ point along the contour and Q is the $q_{th}$ point, then cnorm(p−q) gives the number of points between P and Q traveling clockwise along the contour from Q to P. If this number is less than N/2 then P is to the "right" of Q and hence must correspond to the pointing finger.

Having determined which peak corresponds to which finger, the above-described pose estimation process is applied to each peak. The result is a pair of poses $\{(\bar{x},\bar{y},\bar{θ}), (\bar{x}_s,\bar{y}_s,\bar{θ}_s)\}$ for the pointing finger and a pair of poses $\{(\bar{x},\bar{y}, \bar{θ}),(\bar{x}_s,\bar{y}_s,\bar{θ}_s)\}$ for the thumb.

3. Estimating Three-Dimensional (3D) Pose

This section describes how the 3D pose of the pointing finger is determined from its two planar poses. The estimated 3D pose is a 5-tuple (X, Y, Z, α, ε) where (X, Y, Z) denotes the fingertip position in 3D space and (α, ε) denotes the respective azimuth and elevation angles of an axis of the pointing finger.

Figure 6:
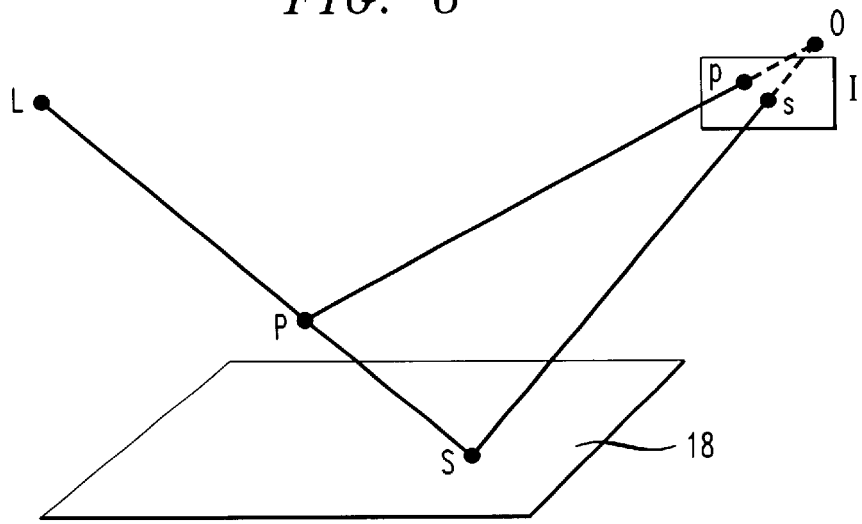
FIG. 6 shows the imaging geometry of the FIG. 1 input interface system.

FIG. 6 illustrates the imaging geometry of the camera and light source arrangement shown in FIG. 2. The point O is the optical center of the camera 14 and I is the image plane. The light source 20 represented by the point $L=[X_L, Y_L, Z_L]^T$ casts a shadow of the point $P=[X_p, Y_p, Z_p]^T$ on the surface 18. The shadow falls at location $S=[X_S, Y_S, Z_S]^T$. The points P and S are imaged by the camera 14 at pixel locations $p=[x_p, y_p]^T$ and $s=[x_s, y_s]^T$, respectively. In the illustrative embodiment, point P corresponds to the fingertip and point S to its shadow. The 2D analysis described previously gives the pixel locations of p and s and, also, the planar orientations $θ_p$ and $θ_s$ of the finger and its shadow. The problem is then to compute the 3D position and orientation of the pointing finger from $[x_p, y_p, θ_p]^T$ and $[x_s, y_s, θ_s]^T$.

The camera 14 in the illustrative embodiment is precalibrated with respect to a world coordinate frame which includes the surface 18. Let the surface 18 correspond to the plane Z=0, and assume for purposes of illustration that the position L of the light source is known. Techniques for determining this position will be described below. Let $M_c$ be a known projection matrix of the camera 14. Under perspective projection, the 3×4 projection matrix $M_c$ relates the 3D world coordinates (X, Y, Z) of a point to its image (x, y) by the equation $$\lambda[x,y,1]^T = M_c[X,Y,Z,1]^T \qquad (2)$$

where $\lambda$ is a scale factor. In the illustrative embodiment, the points P and p are related by the expression $$\lambda[x_p,y_p,1]^T = M_c[X_p,Y_p,Z_p,1]^T \qquad (3)$$

and similarly, S and s are related by $$\overline{\lambda}[x_s,y_s,1]^T = M_c[X_s,Y_s,Z_s,1]^T \qquad (4)$$

Note that the image s of the shadow can be viewed either as the projection of S onto the image plane as in Equation (4) or as the projection of P onto the surface 18 (forming the point S) followed by a projection from the surface 18 onto the image plane. The latter case is denoted symbolically by the following expression:

$$P \xrightarrow{M_t} S \xrightarrow{M_c} s \qquad (5)$$

where $M_t$ represents a yet to be determined matrix that corresponds to the projection of P onto the surface 18. Pre-multiplying $M_t$ by $M_c$, one can represent the projection from P to s directly by $$P \xrightarrow{\overline{M}} s \qquad (6)$$

where $\overline{M} = M_c M_t$. Note that Equation (3) can also be expressed symbolically as $$P \xrightarrow{M_t} p. \qquad (7)$$

Using Equations (6) and (7), the problem to be solved can be viewed as a standard "stereo" problem. In other words, one can view p as the image of P as seen by a camera with projection matrix $M_c$ as given by Equation (7), and s as the image of P as seen by a second camera with projection matrix $\overline{M} = M_c M_t$ as given by Equation (6). Hence, if the matrices $M_c$ and $M_t$ are known, one can solve for the 3D coordinates of a point given its two projections. In the illustrative embodiment, $M_c$ is known, and $M_t$ can be determined in the manner described below in conjunction with FIG. 7.

Figure 7:
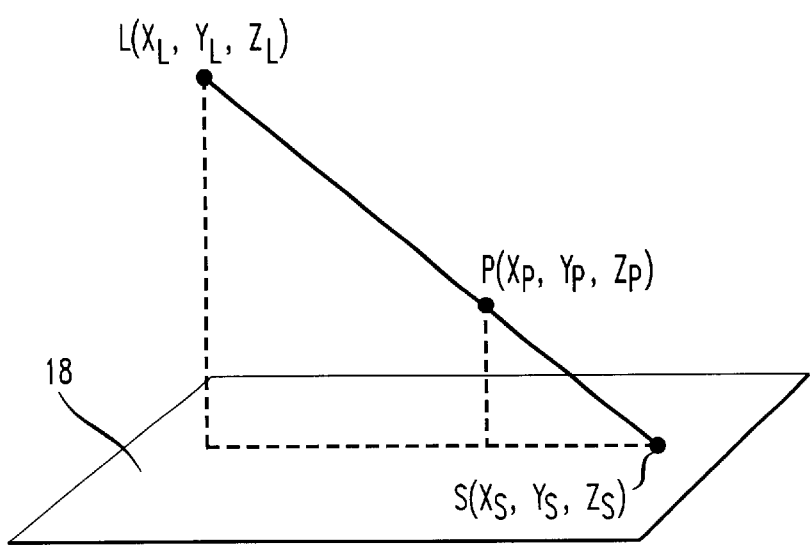
FIG. 7 shows the shadow geometry of the FIG. 1 input interface system.

FIG. 7 shows the geometry of the shadow formation for the camera and light source arrangement shown in FIG. 2. As in the diagram of FIG. 6, S is the shadow of P and L represents the light source. It is again assumed that the coordinates of L are known, from the techniques to be described below. Using similar triangles results in:

$$X_s = \frac{X_p - \frac{X_L}{Z_L} Z_p}{1 - \frac{1}{Z_L} Z_p} \qquad (8)$$

$$Y_s = \frac{Y_p - \frac{Y_L}{Z_L} Z_p}{1 - \frac{1}{Z_L} Z_p}. \qquad (9)$$

Also, since the surface 18 corresponds to Z=0 in the present example, $$Z_s = 0 \qquad (10)$$

The above three equations can be written in matrix notation as $$\begin{bmatrix} X_s \\ Y_s \\ Z_s \\ 1 \end{bmatrix} = \begin{bmatrix} 1 & 0 & -\frac{X_L}{Z_L} & 0 \\ 0 & 1 & -\frac{Y_L}{Z_L} & 0 \\ 0 & 0 & 0 & 0 \\ 0 & 0 & -\frac{1}{Z_L} & 1 \end{bmatrix} \begin{bmatrix} X_p \\ Y_p \\ Z_p \\ 1 \end{bmatrix} \qquad (11)$$

Therefore, the matrix $M_t$ that projects P to S is given by $$M_t = \begin{bmatrix} 1 & 0 & -\frac{X_L}{Z_L} & 0 \\ 0 & 1 & -\frac{Y_L}{Z_L} & 0 \\ 0 & 0 & 0 & 0 \\ 0 & 0 & -\frac{1}{Z_L} & 1 \end{bmatrix} \qquad (12)$$

Note the simple structure of $M_t$. Because of this structure, the combined matrix $\overline{M} = M_c M_t$ differs from $M_c$ only in the third column, i.e., if $$M_c = \begin{bmatrix} m_{11} & m_{12} & m_{13} & m_{14} \\ m_{21} & m_{22} & m_{23} & m_{24} \\ m_{31} & m_{32} & m_{33} & m_{34} \end{bmatrix} \qquad (13)$$

then $$\overline{M} = \begin{bmatrix} m_{11} & m_{12} & m_{11}\frac{-X_L}{Z_L} + m_{12}\frac{-Y_L}{Z_L} + m_{14}\frac{-1}{Z_L} & m_{14} \\ m_{21} & m_{22} & m_{21}\frac{-X_L}{Z_L} + m_{22}\frac{-Y_L}{Z_L} + m_{24}\frac{-1}{Z_L} & m_{24} \\ m_{31} & m_{32} & m_{31}\frac{-X_L}{Z_L} + m_{32}\frac{-Y_L}{Z_L} + m_{34}\frac{-1}{Z_L} & m_{34} \end{bmatrix} \qquad (14)$$

This result is appropriate because, as can be seen from Equations (3) and (4), the first three columns of a projection matrix get multiplied by the X, Y and Z coordinates, respectively, and the last column gets multiplied by 1. If $Z_p=0$, i.e., if the point P lies on the surface 18, then its shadow S coincides with P and hence the images p and s must also coincide.

Now that $\overline{M}$ is known, equations (6) and (7) can be inverted to solve for P given p and s, using standard stereo techniques that are well known in the art. In the illustrative embodiment, a pair of planar poses ($x_p$, $y_p$, $\theta_p$) and ($x_s$, $y_s$, $\theta_s$) for the pointing finger corresponding to projections $M_c$ and $\overline{M}$, respectively. These values can be combined in a straightforward manner to determine the 3D position and orientation of the pointing finger. As previously noted, the process can be repeated for the thumb, if the thumb is extended in the point gesture.

It has been assumed to this point that the position of the light source L is known. The next section describes illustrative techniques for determining the position of L.

4. Calibrating the Light Source

This section presents a simple technique for calibrating the light source L, which as previously noted corresponds to the light source 20 in the arrangement of FIG. 2. Referring again to FIG. 6, the light source L casts the shadow S of a point P in space. P and S are imaged by the camera 14 at known pixel locations p and s, respectively. The camera 14 has been calibrated with respect to a reference frame for which the surface 18 corresponds to Z=0. The coordinates of L may then be determined as follows.

Since the camera parameters and the pixel location p are known, one can determine the parameters of a line $L_{Op}$ through O, p and P. Similarly, one can determine the parameters of a line $L_{Os}$ through O, s and S.

Given the line $L_{Os}$, the coordinates of S can be immediately determined as the intersection of $L_{Os}$ with the plane Z=0. Similarly, if the height h of the point P above surface 18 is known, one can determine its other two coordinates from the intersection of $L_{Op}$ with the plane Z=h. Having computed the locations of P and S, one can compute the equation of the line $L_{SP}$ joining the two points. As shown in FIG. 6, this line passes through the light source L and thus provides one constraint on the location of L. Repeating the above process with another point $\overline{P}$ (of known height $\overline{h}$) and its shadow $\overline{S}$ provides another line passing through the light source L, such that L can be determined uniquely.

The above observation leads to a very simple calibration process. First take a rectangular block of known height and place it on the surface 18. Unless the light source 20 is directly above the block, at least one of the top four corners must cast a shadow on the surface 18. Since the height of this corner is known, one can determine the line joining the corner and the light source. By sliding the block over the table and repeating the above procedure several times, one can arrive at an over-determined system of equations whose solution provides the location of L. Of course, numerous other calibration techniques can be used in conjunction with the present invention.

5. Experimental Results

The above-described illustrative embodiment of the invention uses projections of a hand and its shadow to compute 3D pose. It should be noted that one potential limitation of this approach is occlusion, i.e., when the hand is very close to the surface 18, part of the shadow is hidden by the hand. If the camera thereby fails to see the shadow of an extended finger, then the system does not compute the 3D pose for that finger. One way to avoid this potential problem is to restrict the hand from getting too close to the surface 18. For example, it has been determined in conjunction with the test setup described below that the shadows of an extended pointing finger and thumb are detectable as long as the hand is about 15 cm above the surface 18. Of course, the particular dimensions appropriate to a given implementation will vary depending upon factors such as the positioning and direction of the light source.

The accuracy and usability of the above-described illustrative embodiment has been tested in qualitative and quantitative trials with users of different ages, skin complexions, genders, and hand sizes. The trials were conducted using a system which utilized a 200 MHz SGI Indy computer, using 320×240 pixel frames, at the NTSC field rate of 60 Hz. It was found that the gesture recognition of the present invention used less than 30% of the CPU, and thus has a performance rate of about 200 Hz excluding video capture. This illustrates that the invention can be implemented in a computationally inexpensive manner.

The above-noted trials indicated that, of the three gestures, the point and reach gestures are recognized almost perfectly with error rates of less than 1/500. The recognition results for the click gesture, however, varied to a certain extent from user to user and as a function of training. More specifically, some users easily reached a 90% recognition rate, while for others the recognition rate was less than 50%. Nonetheless, it was found that most users could substantially perfect this gesture with only a few minutes of training.

The stability of the planar pose estimation was computed as a standard deviation, over short periods of about 3 to 5 seconds, while the hand was held steady. The jitter in position was found to be less than one pixel and less than half a degree in the angle θ. The jitter in 3D pose varied with the position and orientation of the hand. Typically, the jitter in orientation is less than 2 degrees and the jitter in Z is less than 5 mm.

As for usability, fatigue can become an issue if the hand is held above the surface 18 for extended periods of time. However, the elbow can rest on the surface and thereby provide some support.

6. Applications

The present invention can be used as an input interface to a wide variety of applications that require multi-dimensional control. A number of such applications are described in greater detail below.

6.1 Virtual Fly-Thrus

Virtual flights over simulated terrains are one possible computer application that can benefit from the gesture-based input interface of the present invention. In an example of this type of application, a user stretches out his or her pointing finger and thumb and imitates flying by moving the hand. The velocity of flight is controlled by the Y-component of the pose. The roll, pitch and yaw angles are controlled by the corresponding angles of the hand. All angles are controlled incrementally, in a manner similar to a steering wheel of a car or a tiller of a boat. In other words, when the pointing finger points at a non-zero angle, the corresponding flight direction keeps changing continuously until the finger is straightened again. Thus, to reverse the direction of flight, the user does not have to point backwards, but instead points at a convenient angle and turns the pointing finger around smoothly.

6.2 Graphical Editor

The input interface system of the invention can also be utilized in conjunction with a graphical editor application that allows users to manipulate objects in a virtual environment using hand gestures. In such applications, user gestures can control, e.g., a 3D cursor that interacts with objects in the scene or a 2D cursor which selects actions from a menu. The graphical editor may operate in multiple modes, with the user switching between these modes using gestures. The menu may be configured to give users access to other functions, such as viewpoint control, object creation/deletion, and drawing curves and ribbons. In this manner, the user can, e.g., quickly create compound objects or scenes from primitive objects.

6.3 Controlling Video Games

Video game applications are another example of a set of applications that may utilize the gesture-based input interface system of the present invention. One aspect of almost all video games is navigation, and the point gesture is ideally suited for navigation. More specifically, the point gesture may be used to move a player. Other gestures are also appropriate to video game applications, e.g., the reach gesture may be used to open doors, and the click gesture may be used to fire a gun. The present invention thus allows natural and intuitive controls for video game applications.

It should be emphasized that the exemplary systems, processing techniques and applications described herein are intended to illustrate the operation of the invention, and therefore should not be construed as limiting the invention to any particular embodiment or group of embodiments. For example, although illustrated herein using an exemplary set of gestures, the invention can be implemented using other types of gestures. In addition, the invention can be implemented using a wide variety of different types of processing systems. These and numerous other alternative embodiments within the scope of the following claims will therefore be apparent to those skilled in the art.

What is claimed is:

1. A method of providing gesture-based user control of an application running on a computer, he method comprising the steps of:
   receiving at least one image signal; and
   processing the at least one image signal to determine if the image contains one of a plurality of designated user gestures, each of the gestures being translatable to a particular control signal for controlling the application, the processing step for a given one of the designated user gestures determining position and orientation information for a pointing finger of a hand of the user and its corresponding shadow, the position and orientation information for the pointing finger and its shadow being utilized to generate a three-dimensional pose estimate for the pointing figure in the given gesture.

2. The method of claim 1 wherein the plurality of designated user gestures comprises at least a point gesture, a reach gesture and a click gesture.

3. The method of claim 1 wherein the pointing finger comprises an index finger of the user.

4. The method of claim 1 wherein the three-dimensional pose estimate comprises a set of five parameters (X, Y, Z, $\alpha$, $\epsilon$), where (X, Y, Z) denotes the position of a tip of the pointing finger in three-dimensional space, and ($\alpha$, $\epsilon$) denotes the respective azimuth and elevation angles of an axis of the pointing finger.

5. The method of claim 1 wherein the position and orientation for the pointing finger comprises a pair of two-dimensional poses, one representing a peak in the image signal corresponding to, the pointing finger and the other representing a peak in the image signal corresponding to the shadow of the pointing finger.

6. The method of claim 5 wherein the pair of two-dimensional poses is of the form $\{(x,y,\theta), (x_s,y_s,\theta_s)\}$, where (x,y) and $\theta$ denote the position of a tip and orientation, respectively, of the pointing finger in two-dimensional space, and $(x_s,y_s)$ and $\theta_s$ denote the position of a tip and orientation, respectively, of the shadow of the pointing finger in two-dimensional space.

7. The method of claim 1 wherein the processing step further includes performing an initial classification of a given image as containing one of a point gesture, a reach gesture and a ground gesture based on extraction of local features, followed by a finite state classification which classifies the given image as containing one of the point gesture, a click gesture and a ground gesture, the position and orientation information for the pointing finger and its corresponding shadow being determined only if the image is classified as containing the point gesture.

8. The method of claim 7 wherein the local features comprise peaks and valleys in a boundary of a connected region representative of the hand in the given image, the peaks corresponding to points of curvature maxima where the boundary is locally convex, and the valleys corresponding to points of curvature minima where the boundary is locally concave, the initial classification being made based on the number of peaks and the number of valleys.

9. The method of claim 7 wherein the result of the finite state classification for the given image is a function of a result of the finite state classification for a previous image and a result of the initial classification for the given image.

10. The method of claim 7 wherein the finite state classification determines if the initial classification is a point gesture, and if so attempts to determine the position and orientation of the pointing finger and its corresponding shadow in the image.

11. The method of claim 1 wherein the generation of the three-dimensional pose estimate for the pointing finger in the given gesture utilizes calibration information associated with a light source which is utilized to produce the shadow of the pointing finger.

12. An apparatus for providing gesture-based user control of an application running on a computer, the apparatus comprising:
   a processing device associated with the computer and operative to process at least one image signal to determine if the image contains one of a plurality of designated user gestures, each of the gestures being translatable to a particular control signal for controlling the application, the processing step for a given one of the designated user gestures determining position and orientation information for a pointing finger of a hand of the user and its corresponding shadow, the position and orientation information for the pointing finger and its shadow being utilized to generate a three-dimensional pose estimate for the pointing figure in the given gesture.

13. An input interface system for providing gesture-based user control of an application, the system comprising:
   at least one camera;
   a light source arranged so as to create a shadow of a user hand within a field of view of the camera; and
   a computer coupled to the camera and operative to process at least one image signal received from the camera to determine if the image contains one of a plurality of designated user gestures, each of the gestures being translatable to a particular control signal for controlling the application, the processing step for a given one of the designated user gestures determining position and orientation information for a pointing finger of a hand of the user and its corresponding shadow, the position and orientation information for the pointing finger and its shadow being utilized to generate a three-dimensional pose estimate for the pointing figure in the given gesture.

14. An article of manufacture containing one or more software programs which, when executed in a processing device, cause the processing device to perform the step of processing at least ode image signal to determine if the image contains one of a plurality of designated user gestures, each of the gestures being translatable to a particular control signal for controlling the application, the processing step for a given one of the designated user gestures determining position and orientation information for a pointing finger of a hand of the user and its corresponding shadow, the position and orientation information for the pointing finger and its shadow being utilized to generate a three-dimensional pose estimate for the pointing figure in the given gesture.

* * * * *